United States Patent
Tajima

(10) Patent No.: US 11,530,144 B2
(45) Date of Patent: Dec. 20, 2022

(54) BALLAST WATER TREATMENT METHOD

(71) Applicant: Kuraray Co., Ltd., Kurashiki (JP)

(72) Inventor: Yasuhiro Tajima, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 157 days.

(21) Appl. No.: 16/642,680

(22) PCT Filed: Aug. 27, 2018

(86) PCT No.: PCT/JP2018/031586
§ 371 (c)(1),
(2) Date: Feb. 27, 2020

(87) PCT Pub. No.: WO2019/044769
PCT Pub. Date: Mar. 7, 2019

(65) Prior Publication Data
US 2020/0189943 A1    Jun. 18, 2020

(30) Foreign Application Priority Data
Aug. 31, 2017    (JP) .............................. JP2017-166393

(51) Int. Cl.
*C02F 1/50* (2006.01)
*B63J 4/00* (2006.01)
(Continued)

(52) U.S. Cl.
CPC .................. *C02F 1/50* (2013.01); *B63J 4/002* (2013.01); *C02F 1/72* (2013.01);
(Continued)

(58) Field of Classification Search
CPC ... B63B 13/00; B63J 4/002; B63J 4/00; C02F 1/004; C02F 1/50; C02F 1/72; C02F 1/76;
(Continued)

(56) References Cited

U.S. PATENT DOCUMENTS

2005/0155539 A1* 7/2005 Randall .................. C02F 1/008
                                                      114/125
2008/0164217 A1* 7/2008 Nishizawa ............... B63J 4/002
                                                      210/747.6
(Continued)

FOREIGN PATENT DOCUMENTS

JP        2009-112978 A    5/2009
JP          4915295 B2     4/2012
(Continued)

OTHER PUBLICATIONS

Extended European Search Report dated Mar. 18, 2021 in European Patent Application No. 18849760.6, 7 pages.
(Continued)

*Primary Examiner* — Akash K Varma
(74) *Attorney, Agent, or Firm* — Oblon, McClelland, Maier & Neustadt, L.L.P.

(57) ABSTRACT

A ballast water treatment method includes: a step of supplying a sterilizing component to a ballast pipe while taking ballast water into a ballast tank through the ballast pipe; a first measurement step of measuring the concentration of the sterilizing component in the ballast water after the sterilizing component is supplied; a circulation step of returning the ballast water stored in the ballast tank to the ballast pipe through a circulation pipe; a second measurement step of measuring the concentration of the sterilizing component contained in the ballast water returned to the ballast pipe; and a step of supplying the sterilizing component to the ballast pipe 2 when the concentration of the sterilizing component measured in the second measurement step is less than 0.2 times the concentration of the sterilizing component measured in the first measurement step. In the first supply step, the sterilizing component is supplied to the ballast pipe 2 such that the concentration of the sterilizing component (Continued)

measured in the first measurement step becomes 6 mg/L or more.

8 Claims, 4 Drawing Sheets

(51) Int. Cl.
  *C02F 1/72* (2006.01)
  *C02F 103/00* (2006.01)
(52) U.S. Cl.
  CPC .. *C02F 2103/008* (2013.01); *C02F 2301/046* (2013.01); *C02F 2303/04* (2013.01)
(58) Field of Classification Search
  CPC ............ C02F 2103/008; C02F 2209/29; C02F 2301/043; C02F 2301/046; C02F 2303/04
  USPC ......................................................... 210/739
  See application file for complete search history.

(56) References Cited

U.S. PATENT DOCUMENTS

| | | |
|---|---|---|
| 2018/0312237 A1 | 11/2018 | Tajima |
| 2018/0346088 A1 | 12/2018 | Tajima |

FOREIGN PATENT DOCUMENTS

| | | |
|---|---|---|
| JP | 2015-16761 A | 1/2015 |
| JP | 2016-64376 A | 4/2016 |
| JP | 2016-198698 A | 12/2016 |
| WO | WO 2012/077958 A2 | 6/2012 |
| WO | WO 2015/075820 A1 | 5/2015 |
| WO | WO 2016/174890 A1 | 11/2016 |
| WO | WO 2017/073513 A1 | 5/2017 |

OTHER PUBLICATIONS

International Search Report dated Nov. 6, 2018 in PCT/JP2018/031586 filed on Aug. 27, 2018, 2 pages.

* cited by examiner

BALLAST WATER TREATMENT METHOD

TECHNICAL FIELD

The present invention relates to a ballast water treatment method, and more particularly to a ballast water treatment method capable of additionally supplying a sterilizing component to such an extent that microorganisms in ballast water do not proliferate.

BACKGROUND ART

A ship such as a freighter which carries cargo such as ore or crude oil is stable on sea when the cargo is carried. However, when cargo is not loaded on the ship or an amount of cargo on the ship is small, the ship cannot ensure a propeller immersion depth or safety navigation. For this reason, when a ship departs with no cargo or with a small amount of cargo, ballast water is filled into ballast tanks before departure. This increases the weight of the ballast tanks. Conversely, when cargo is loaded in a port, ballast water in the ballast tanks is discharged. This reduces the weight of the ballast tanks. By adjusting an amount of ballast water stored in the ballast tanks in this way, the weight of the ship is balanced.

When a ship moves between a port where cargo is loaded and a port where cargo is unloaded, in general, a water quality environment at one port differs from a water quality environment at the other port. For this reason, there is an international concern that the difference in microorganisms contained in ballast water between one port and the other port will adversely affect marine ecosystems. To reduce such a concern, the International Maritime Organization (IMO) adopted the International Convention for the Control and Management of Ships' Ballast Water and Sediments in 2004. The Convention sets an upper limit of the number of organisms contained in ballast water drained from a ship. In recent years, the guidelines for ballast water management standards have become stricter and hence, not only the above international standards but also regional regulations have been stipulated. Further, in an actual operation, when a ship receives a ballast water quality test at a port, the ship is also required to surely complete the biological treatment of ballast water simultaneously.

As a conventional method for treating ballast water, for example, Patent Literature 1 listed below discloses a method for monitoring turbidity or chromaticity of ballast water, and a method for controlling the number of organisms in ballast water by an image analysis.

Further, in a ballast water treatment method disclosed in Patent Literature 2, the absorbance or the transmittance of raw water taken as ballast water into a ballast tank is measured, and an oxidizing agent having an oxide concentration calculated based on the measurement result is supplied to the ballast water. By supplying the oxidizing agent having the calculated concentration to the ballast water, it is possible to supply an appropriate amount of oxidizing agent to the ballast water.

As an attempt which differs from the methods disclosed in Patent Literatures 1 and 2, there has been known a ballast water control method disclosed in Patent Literature 3. In Patent Literature 3, in filling ballast water into a ballast tank, a sterilizing component is not introduced into the ballast water, and thereafter, an amount of a sterilizing component to be added to the ballast water is determined while a change of the oxide concentration with time in the ballast water is measured. According to this method, when a water region into which ballast water is taken is determined, a sterilizing component in an amount suitable for killing microorganisms can be added.

In a ballast water treatment method disclosed in Patent Literature 4, at the time of discharging ballast water stored in a ballast tank, circulation of ballast water is performed where ballast water stored in the ballast tank is returned to the initial ballast tank through a circulation flow path. By supplying a neutralizing agent into ballast water during circulation of ballast water, a sterilizing component contained in ballast water is reduced and neutralized so that the sterilizing component becomes harmless.

A ballast water treatment apparatus disclosed in Patent Literature 5 has a circulation pipe for returning ballast water stored in a ballast tank to a ballast pipe, and a sterilizing component supply unit for introducing a sterilizing component into the ballast pipe. By introducing the sterilizing component into the ballast pipe from the sterilizing component supply unit, bacteria contained in ballast water can be killed.

The turbidity and chromaticity of ballast water measured by the method disclosed in the above-mentioned Patent Literature 1 do not always have con'elation with the number of microorganisms in ballast water, and are influenced by mud, organic materials and the like contained in ballast water in a sea area where ballast water is taken. Further, information obtained by the above-mentioned image analysis relates to only an extremely small portion of the whole ballast water and hence, the number of microorganisms in the whole ballast water cannot be grasped. Further, basically, microorganisms are not uniformly distributed in the whole ballast water. Accordingly, even when the turbidity and chromaticity of ballast water can be grasped locally by an image analysis, it is not reasonable to decide a treatment amount of whole ballast water based on such data.

In the case where the ballast water treatment method disclosed in Patent Literature 2 is used, inorganic particles such as mud affect the measurement of absorbance or transmittance of raw water. Accordingly, it is difficult to properly grasp a required amount of oxide concentration based on absorbance or transmittance of raw water.

To summarize the above-mentioned disclosure of Patent Literatures 1 and 2, it is safe to say that the proper acquisition of an amount of a sterilizing component to be supplied to ballast water is difficult even when parameters such as turbidity, chromaticity, absorbance, or transmittance of ballast water are used.

In the control method for ballast water disclosed in Patent Literature 3, a condition that a chlorine-based active substance is not added to ballast water at the time of filling ballast water is indispensable. However, when a sterilizing component is not added to ballast water at the time of filling ballast water, the number of microorganisms is increased in ballast water stored in the ballast tank. Accordingly, a large amount of chlorine-based active substance becomes necessary for killing microorganisms in ballast water.

Patent Literature 4 only discloses a technique of making ballast water harmless by neutralizing active components contained in ballast water by a neutralizing agent, and does not describe that a sterilizing component is additionally supplied to ballast water in the ballast tank.

Patent Literature 5 discloses the extinction of bacteria by supplying a sterilizing component to ballast water, but fails to disclose the extinction of planktons in ballast water. According to the ballast water drainage standard, the number of planktons is determined for each body length. Accordingly, it is necessary to kill planktons in ballast water before ballast water stored in the ballast tank is discharged.

In a conventional ballast water treatment system, during a period where ballast water is stored in a ballast tank, dissolved organic substances and ammoniacal substances existing in ballast water generate a chemical reaction with sterilizing components and hence, the sterilizing components are consumed. Accordingly, the concentration of the sterilizing components is lowered. In this case, planktons in ballast water in a condition of biological rest may be revived. Alternatively, in the case where planktons are in an egg state when a sterilizing component is supplied, at timing that the concentration of the sterilizing component contained in ballast water is lowered with a lapse of time, planktons in an egg state may be newly hatched and grow. In view of such circumstances, by merely applying sterilizing treatment to ballast water at the time of filling ballast water, it is difficult to kill planktons until ballast water is discharged.

CITATION LIST

Patent Literature

Patent Literature 1: JP 2009-112978 A
Patent Literature 2: JP 2016-064376 A
Patent Literature 3: WO 2015/075820
Patent Literature 4: JP 2015-016761 A
Patent Literature 5: WO 2016/174890

SUMMARY OF INVENTION

It is an object of the present invention to provide a ballast water treatment method which can kill microorganisms in ballast water, that is, both bacteria and planktons, with a smaller amount of sterilizing component compared to a prior art.

The inventors of the present invention have found that the timing at which a sterilizing component is supplied to ballast water should not be limited to only the time of filling ballast water, and supplying a sterilizing component to ballast water before discharging ballast water is also effective. Based on such finding, the inventors of the present invention also have found that a sterilizing component in an amount sufficient to kill microorganisms in ballast water with certainty is supplied to ballast water at the time of filling ballast water, and further, a sterilizing component in an amount sufficient to kill planktons is additionally supplied to ballast water before ballast water is discharged. As a result of further extensive studies made by the inventors of the present invention, it has become apparent that a supply amount of sterilizing component necessary for killing planktons is determined based on a relative value with respect to a supply amount of sterilizing component necessary for sterilizing microorganisms, and the present invention has been completed based on the result of such studies.

That is, according to one aspect of the present invention, a ballast water treatment method includes: a first supply step of supplying a sterilizing component to a ballast pipe while taking ballast water into a ballast tank through the ballast pipe; a first measurement step of measuring concentration of the sterilizing component in the ballast water after the sterilizing component is supplied; a circulation step of returning the ballast water stored in the ballast tank to the ballast pipe through a circulation pipe connected to the ballast tank before the ballast water stored in the ballast tank is discharged; a second measurement step of measuring the concentration of the sterilizing component contained in the ballast water returned to the ballast pipe; and a second supply step of supplying the sterilizing component to the ballast pipe such that the concentration of the sterilizing component contained in the ballast water flowing through the ballast pipe becomes 0.2 times or more and 0.5 times or less the concentration of the sterilizing component measured in the first measurement step when the concentration of the sterilizing component measured in the second measurement step is less than 0.2 times the concentration of the sterilizing component measured in the first measurement step, in which in the first supply step, the sterilizing component is supplied to the ballast pipe such that the concentration of the sterilizing component measured in the first measurement step becomes 6 mg/L or more.

DESCRIPTION OF EMBODIMENTS

Figure 1:
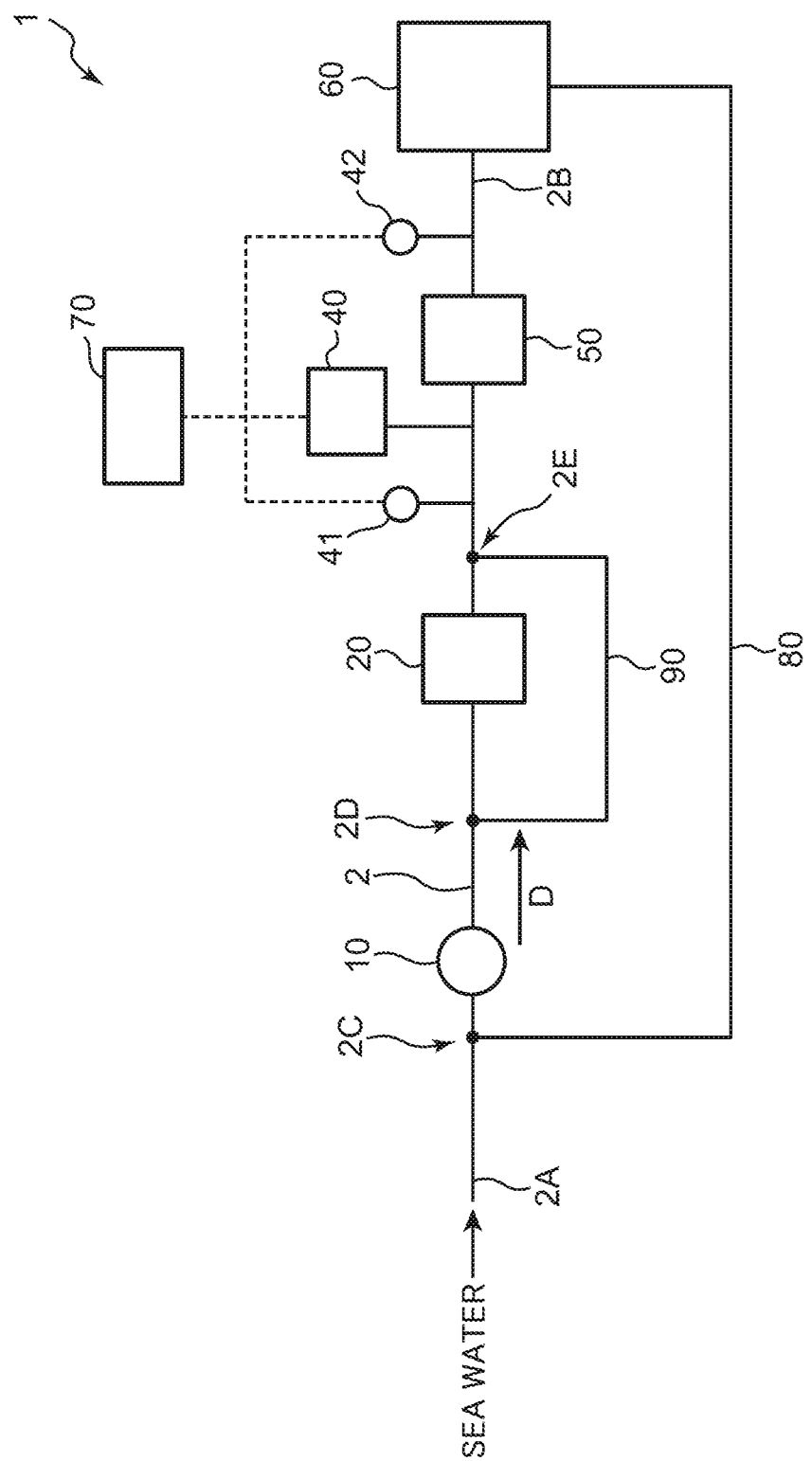
FIG. 1 is a schematic view showing the configuration of a ballast water treatment apparatus used in a ballast water treatment method according to an embodiment.

Hereinafter, the description will be given of the configuration of a ballast water treatment apparatus 1 which performs a ballast water treatment method according to an embodiment with reference to FIG. 1.

First Embodiment (Ballast Water Treatment Apparatus)

The ballast water treatment apparatus 1 according to a first embodiment is used at the time of supplying a sterilizing component to sea water (ballast water) taken into a ballast tank 60 disposed in a ship and at the time of increasing the concentration of the sterilizing component in ballast water in the ballast tank 60. The ballast water treatment apparatus 1 mainly includes a ballast pipe 2, a ballast pump 10, a filter 20, a pre-supply concentration measuring unit 41, a sterilizing component supply unit 40, a mixer 50, a post-supply concentration measuring unit 42, the ballast tank 60, a sterilization control unit 70, a circulation pipe 80, and a bypass pipe 90.

The ballast pipe 2 is connected to the ballast tank 60. The ballast pipe 2 forms a supply flow path for introducing sea water pumped up in the ship into the ballast tank 60. The ballast pipe 2 has one pipe port 2A into which sea water flows, and the other pipe port 2B connected to the ballast tank 60. Sea water flows into the ballast pipe 2 from one pipe port 2A. In the ballast pipe 2, sea water flows toward the other pipe port 2B along a flow direction D of sea water. Thus, sea water is introduced into the ballast tank 60, and is stored in the ballast tank 60 as ballast water for stabilizing a hull.

The circulation pipe 80 is used for returning a part of ballast water stored in the ballast tank 60 to the ballast pipe 2. Specifically, the circulation pipe 80 has one end connected to the ballast tank 60, and the other end connected to the ballast pipe 2 at a first connection portion 2C positioned on an upstream side of the ballast pump 10 on the ballast pipe 2. By connecting the circulation pipe 80 at the above-mentioned position, a circulation flow path is formed where a part of ballast water in the ballast tank 60 is returned into the ballast pipe 2 via the circulation pipe 80 and ballast water flows into the ballast tank 60 along the flow direction D in the ballast pipe 2.

The ballast pump 10 is provided for generating a drive force which is used for supplying ballast water flowing through the ballast pipe 2 to the ballast tank 60. The ballast tank 10 is provided on the ballast pipe 2 on a downstream stream side of the first connection portion 2C in the flow direction of ballast water. Due to a pumping pressure of the ballast pump 10, sea water flows into the ballast pipe 2 and is supplied to the ballast tank 60. Further, due to the pumping pressure of the ballast pump 10, ballast water in the ballast tank 60 flows into the ballast pipe 2 via the circulation pipe 80, and this ballast water flows in the ballast pipe 2 to be returned to the ballast tank 60.

The filter 20 is disposed on the ballast pipe 2 on a downstream side (ballast tank 60 side) of the ballast pump 10 in the flow direction D of ballast water. When ballast water is taken into the ballast tank 60, ballast water passes through the filter 20, so that it is possible to remove relatively large-sized creatures among planktons and suspended matters from ballast water. Accordingly, an amount of sterilizing component to be supplied to the ballast pipe 2 can be suppressed.

The bypass pipe 90 is connected to the ballast pipe 2 such that ballast water which flows through the ballast pipe 2 can bypass the filter 20. Specifically, one end of the bypass pipe 90 is connected to a second connection portion 2D positioned on an upstream side of the filter 20 on the ballast pipe 2, and the other end of the bypass pipe 90 is connected to a third connection portion 2E positioned on a downstream side of the filter 20 on the ballast pipe 2 In the case where ballast water stored in the ballast tank 60 is returned to the ballast pipe 2 via the circulation pipe 80 and thereafter ballast water flows through the ballast pipe 2, the ballast water can bypass the filter 20 by flowing through the bypass pipe 90. Accordingly, compared to the case where ballast water passes through the filter 20, ballast water stored in the ballast tank 60 can be returned into the ballast pipe 2 at a higher speed. Although not illustrated, an open/close valve is provided on the ballast pipe 2 between the second connection portion 2D and the third connection portion 2E. Then, when the open/close valve is closed, ballast water flows through the bypass pipe 90 so as to bypass the filter 20.

The sterilizing component supply unit 40 is connected to the ballast pipe 2 on a downstream side of the third connection portion 2E so as to supply a sterilizing component to the ballast pipe 2. A supply amount of sterilizing component from the sterilizing component supply unit 40 to the ballast pipe 2 is controlled by the sterilization control unit 70 described later. By supplying the sterilizing component to the ballast pipe 2 from the sterilizing component supply unit 40 at the time of taking ballast water into the ballast pipe 2, the sterilizing component is supplied to ballast water. Accordingly, microorganisms (such as bacteria and planktons) which exist in ballast water can be killed.

The sterilizing component supply unit 40 is used also for increasing the concentration of the sterilizing component contained in ballast water stored in the ballast tank 60. That is, when ballast water stored in the ballast tank 60 flows into the circulation pipe 80 and the ballast pipe 2, the sterilizing component is supplied to ballast water flowing through the ballast pipe 2 from the sterilizing component supply unit 40 to the ballast pipe 2. Accordingly, ballast water to which the sterilizing component is added is returned to the ballast tank 60. As a result, the concentration of the sterilizing component contained in ballast water in the ballast tank 60 can be increased.

The sterilizing component supply unit 40 may be of any type, provided that the sterilizing component supply unit 40 can supply a sterilizing component to ballast water which passes through the ballast pipe 2. The sterilizing component supply unit 40 may have, for example, a configuration in which a sterilizing component is directly injected into the ballast pipe 2, a configuration in which a solution containing a sterilizing component of high concentration is injected into the ballast pipe 2, a configuration in which ozone generated by an ozone generator is injected into the ballast pipe 2, or a configuration in which hypochlorous acid is generated by applying electrolysis to ballast water which contains sea water. Among these, it is preferable that a solution which contains a component capable of generating hypochlorous acid is supplied to the ballast pipe 2. Thus, power consumption can be reduced at the time of performing ballast water treatment.

A sterilizing component which generates hypochlorous acid may be hypochlorites such as sodium hypochlorite and calcium hypochlorite, chlorinated isocyanurates such as sodium dichloroisocyanurate and trichloroisocyanuric acid, or the like. Among these, hypochlorites exhibit basicity in an aqueous solution, and chlorinated isocyanurates exhibit acidity in an aqueous solution. Since hypochlorous acid exhibits a strong sterilizing power in an acid state and hence, it is preferable to use chlorinated isocyanurates, and it is more preferable to use a solution containing a sterilizing component which is prepared by dissolving chlorinated isocyanurate in water containing no salt. Among chlorinated isocyanurates, it is preferable to use sodium dichloroisocyanurate because of high solubility in water. Dihydrate of sodium dichloroisocyanurate takes a solid state and hence, is more preferable from a viewpoint that preservation, storage and transportation are minimally limited. On the other hand, a trichloroisocyanuric acid exhibits high acidity in an aqueous solution, and is advantageous in that effective chlorine concentration is high.

The pre-supply concentration measuring unit 41 is provided for measuring concentration of a sterilizing component contained in ballast water stored in the ballast tank 60. The pre-supply concentration measuring unit 41 is connected to a portion of the ballast pipe 2 on a downstream side of the third connection portion 2E in the flow direction of the ballast water and on an upstream side of the sterilizing component supply unit 40 in the flow direction of ballast water. By measuring the concentration of a sterilizing component contained in ballast water by the pre-supply concentration measuring unit 41 disposed at such a position, concentration of the sterilizing component in ballast water stored in the ballast tank 60 can be grasped. A measurement result obtained by such measurement is inputted to the sterilization control unit 70.

In this embodiment, the pre-supply concentration measuring unit 41 is mounted on the ballast pipe 2 between the third connection portion 2E and the sterilizing component supply unit 40. However, the mounting position of the pre-supply concentration measuring unit 41 is not limited to such a position. That is, the mounting position of the pre-supply concentration measuring unit 41 is not particularly limited as long as the mounting position is a position where the concentration of a sterilizing component in ballast water in the ballast tank 60 can be measured. For example, the pre-supply concentration measuring unit 41 may be mounted on the ballast tank 60, the circulation pipe 80, the bypass pipe 90, or the ballast pipe 2 between the first connection portion 2C and the second connection portion 2D.

The mixer 50 is provided for stirring ballast water which flows through the ballast pipe 2, and is connected to the portion of the ballast pipe 2 on a downstream side of the sterilizing component supply unit 40. By stirring, by the mixer 50, ballast water containing a sterilizing component which is supplied from the sterilizing component supply unit 40, the concentration of the sterilizing component contained in ballast water can be made uniform.

The post-supply concentration measuring unit 42 is provided for measuring the concentration of the sterilizing component contained in ballast water, after the sterilizing component is supplied from the sterilizing component supply unit 40 and ballast water is stirred by the mixer 50. The post-supply concentration measuring unit 42 is connected to a portion of the ballast pipe 2 on a downstream side of the mixer 50. By providing the post-supply concentration measuring unit 42 at such a position, it is possible to grasp the concentration of the sterilizing component contained in ballast water which is supplied to the ballast tank 60. A measurement result obtained by such measurement is inputted to the sterilization control unit 70.

The pre-supply concentration measuring unit 41 and the post-supply concentration measuring unit 42 can be of any type without being particularly limited, provided that it is possible to detect the TRO concentration of ballast water which flows through the ballast pipe 2.

Figure 2:
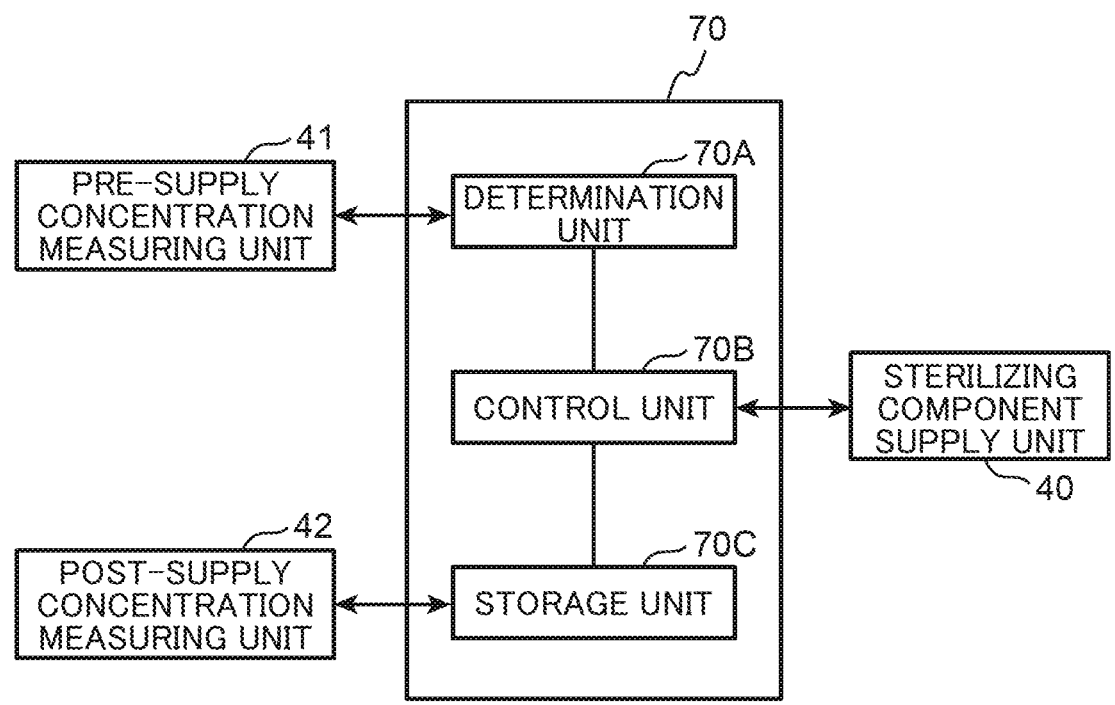
FIG. 2 is a schematic view for describing inputting and outputting of a sterilization control unit in the above ballast water treatment apparatus.

A measurement result of the concentration of the sterilizing component in ballast water measured by the pre-supply concentration measuring unit 41 and the post-supply concentration measuring unit 42 is inputted to the sterilization control unit 70. The sterilization control unit 70 performs a control for adjusting an amount of the sterilizing component supplied from the sterilizing component supply unit 40 to the ballast pipe 2 based on the inputted measurement result. Hereinafter, the configuration of the sterilization control unit 70 will be described in detail with reference to FIG. 2. FIG. 2 is a schematic diagram showing inputting and outputting of the sterilization control unit 70.

As shown in FIG. 2, the sterilization control unit 70 includes a determination unit 70A, a control unit 70B, and a storage unit 70C. With such a configuration, the sterilization control unit 70 electromagnetically controls an amount of sterilizing component to be supplied from the sterilizing component supply unit 40 to the ballast pipe 2. A measurement result of the concentration of the sterilizing component contained in ballast water measured by the pre-supply concentration measuring unit 41 is inputted to the determination unit 70A. The storage unit 70C stores data on the concentration of the sterilizing component measured by the post-supply concentration measuring unit 42 at the time of filling water in the ballast tank 60. The determination unit 70A compares a measurement result inputted from the pre-supply concentration measuring unit 41 with the concentration of the sterilizing component stored in the storage unit 70C. Based on a comparison result, the determination unit 70A determines whether or not it is necessary to introduce the sterilizing component from the sterilizing component supply unit 40 to the ballast pipe 2.

A result of the determination made by the determination unit 70A is inputted to the control unit 70B. The control unit 70B adjusts an amount of sterilizing component to be introduced into the ballast pipe 2 from the sterilizing component supply unit 40 based on the result of the determination. Specifically, when the determination unit 70A determines that it is necessary to increase the concentration of the sterilizing component contained in ballast water, the control unit 70B controls the sterilizing component supply unit 40 such that the sterilizing component is supplied from the sterilizing component supply unit 40 to the ballast pipe 2. On the other hand, when the determination unit 70A determines that it is not necessary to introduce the sterilizing component into the ballast pipe 2, the control unit 70B controls the sterilizing component supply unit 40 such that the sterilizing component is not supplied from the sterilizing component supply unit 40 to the ballast pipe 2.

In this manner, the concentration of the sterilizing component contained in ballast water stored in the ballast tank 60 is measured by the pre-supply concentration measuring unit 41, and the result of the measurement is fed back to the control unit 70B. As a result, a supply amount of sterilizing component supplied from the sterilizing component supply unit 40 to the ballast pipe 2 can be adjusted. Specifically, in the case where the concentration of the sterilizing component in ballast water is less than 0.2 times the concentration of the sterilizing component measured by the post-supply concentration measuring unit 42 at the time of filling ballast water, a supply amount of sterilizing component from the sterilizing component supply unit 40 to the ballast pipe 2 is adjusted such that the concentration of the sterilizing component becomes 0.2 times or more the concentration of the sterilizing component measured at the time of filling ballast water. By adjusting an amount of sterilizing component supplied to the ballast pipe 2 from the sterilizing component supply unit 40 in this manner, the concentration of the sterilizing component in ballast water can be properly increased. As a result, the microorganisms and the like existing in ballast water can be killed.

Figure 3:
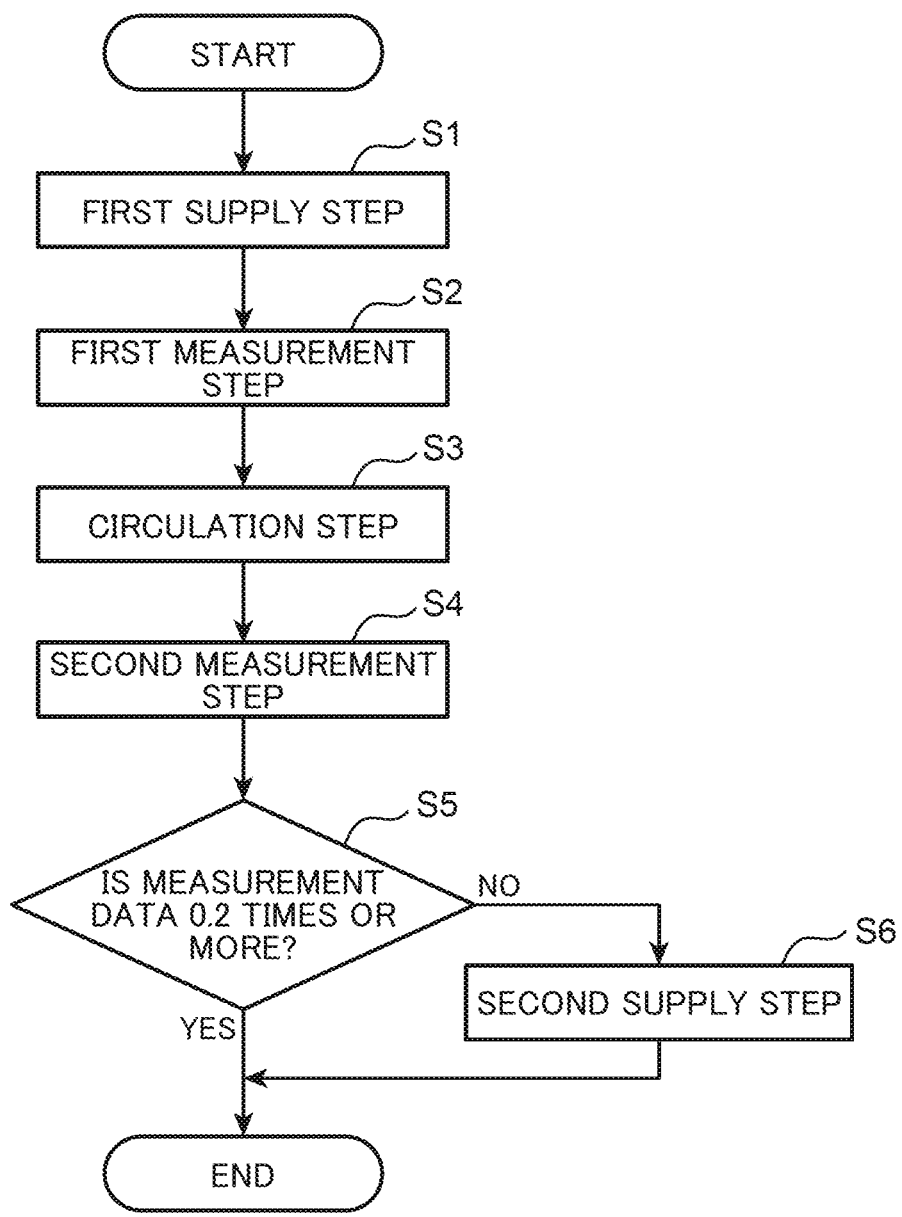
FIG. 3 is a flowchart for describing respective steps of the above ballast water treatment method.

Hereinafter, the respective steps of the ballast water treatment method according to the present embodiment using the ballast water treatment apparatus 1 described above will be described with reference to a flowchart shown in FIG. 3. FIG. 3 is the flowchart showing the respective steps of the ballast water treatment method according to the present embodiment.

<Ballast Water Treatment Method>

As shown in FIG. 3, the ballast water treatment method of the present embodiment includes a first supply step S1, a first measurement step S2, a circulation step S3, a second measurement step S4, and a second supply step S6. In the first supply step S1, a sterilizing component is supplied to the ballast pipe 2 while taking ballast water into the ballast tank 60 through the ballast pipe 2. In the first measurement step S2, the concentration of the sterilizing component contained in ballast water after the sterilizing component has been supplied is measured. In the circulation step S3, the ballast water stored in the ballast tank 60 is returned to the ballast pipe 2 through the circulation pipe 80 connected to the ballast tank 60. In the second measurement step S4, the concentration of the sterilizing component contained in ballast water returned to the ballast pipe 2 is measured. In the second supply step S6, when the concentration of the sterilizing component measured in the second measurement step S4 is less than 0.2 times the concentration of the sterilizing component measured in the first measurement step S2 (S5: No), the sterilizing component is supplied to the ballast pipe 2 such that the concentration of the sterilizing component contained in ballast water flowing through the ballast pipe 2 becomes 0.2 times or more and 0.5 times or less the concentration of the sterilizing component measured in the first measurement step S2. Hereinafter, the respective steps of the ballast water treatment method according to the present embodiment will be described.

(First Supply Step S1)

In the first supply step S1, sea water (ballast water) is taken into the ballast pipe 2 from outside a ship by a pumping pressure of the ballast pump 10. At the time of taking sea water into the ballast pipe 2, the circulation pipe 80 is not used. Then, by making ballast water taken into the ballast pipe 2 pass through the filter 20, microorganisms contained in ballast water are removed. A sterilizing component is supplied from the sterilizing component supply unit 40 to ballast water which has passed through the filter 20 and flows through the ballast pipe 2. Accordingly, bacteria contained in ballast water can be killed.

It is preferable that the TRO concentration of ballast water after a sterilizing component is supplied to ballast water in the first supply step S1 be decided based on amounts of dissolved organic substance and the ammoniacal substance contained in ballast water. For example, when a large amount of dissolved organic substance and dissolved ammoniacal substance is contained in ballast water, it is preferable to increase an amount of sterilizing component supplied to the ballast water. This is because a sterilizing component undergoes a chemical reaction with the dissolved organic substance and dissolved ammoniacal substance so that the sterilizing component is consumed within a short time. After the above-mentioned sterilizing component is supplied to ballast water, it is preferable to stir ballast water using a mixer 50 or the like. Accordingly, sterilizing components contained in ballast water can be dispersed uniformly.

The TRO concentration of the ballast water after the above-mentioned stirring is preferably set to 6 mg/L or more and 10 mg/L or less, more preferably set to 7 mg/L or more and set to 9 mg/L or less, and further more preferably 7.5 mg/L or more and 8.5 mg/L or less. By setting the TRO concentration to 6 mg/L or more, a sterilizing action can be maintained for a long time. Accordingly, microorganisms in ballast water can be killed. In addition, by setting the TRO concentration of ballast water at the time of filling ballast water to a relatively high concentration of 6 mg/L or more, plankton and the like that are longer than common bacteria (such as heterotrophic bacteria) will be killed or on the verge of death. That is, when the TRO concentration is low, the TRO concentration may be too low due to consumption of an active ingredient depending on the water quality. In this case, the bacteria may be killed but the planktons may not be killed. Also, in ballast water treatment, sea water or the like which is filled at a port of call enters the ballast tank. In this case, when treatment waters which are taken at a plurality of ports of call are mixed in the ballast tank, the treatment water will be diluted. Accordingly, there is a concern that a killing effect may be lowered. Accordingly, it is preferable that the concentration of an active ingredient be high. In order to surely kill the matter in the second supply step S6 described later, in the first supply step S1, it is desirable to perform treatment using an active ingredient having the concentration as high as possible.

On the other hand, when a large amount of active ingredient is injected, depending on an active ingredient, corrosion occurs in ballast tanks and pipes, or a use amount of a chemical is increased so that a material cost is increased. Further, at the time of draining ballast water, a large amount of time is required for neutralization treatment of an active ingredient or a neutralizing agent is required. For this reason, by setting the TRO concentration to 10 mg/L or less, it is possible to suppress the supply of an excessive amount of sterilizing component to ballast water. In particular, when a chlorine-based chemical is used as a sterilizing component, by setting the TRO concentration of the ballast water to 10 mg/L or less, it is possible to suppress the occurrence of corrosion in the ballast pipe 2 and the ballast tank 60.

(First Measurement Step S2)

Next, in the first measurement step S2, the concentration of a sterilizing component contained in ballast water after the sterilizing component is supplied is measured. This measurement is performed by the post-supply concentration measuring unit 42. The concentration (TRO concentration) of the sterilizing component measured in this step is inputted to the storage unit 70C of the sterilization control unit 70.

(Circulation Step S3)

Next, in the circulation step S3, ballast water stored in the ballast tank 60 is returned to the ballast pipe 2 through the circulation pipe 80. Then, ballast water returned to the ballast pipe 2 is supplied to the ballast tank 60 through the ballast pipe 2 by a pumping pressure of the ballast pump 10. Ballast water stored in the ballast tank 60 in this manner is returned by circulation to the ballast tank 60 through the circulation pipe 80 and the ballast pipe 2.

An amount of ballast water which is circulated in the circulation step S3 per hour is preferably 10% or less of a total volume of ballast water taken into the ballast water treatment apparatus, and is more preferably 5% or less. By circulating ballast water at such a ratio, the balance of a ship can be favorably maintained. Further, an amount of ballast water circulated in the circulation step per hour is preferably ½ or less of a rated capacity of the ballast tank (maximum storage capacity in design). Such an amount of ballast water is more preferably ⅓ or less of the rated capacity of the ballast tank.

(Second Measurement Step S4)

In the second measurement step S4, the concentration of the sterilizing component contained in ballast water returned to the ballast pipe 2 in the circulation step S3 is measured. This measurement is performed by the pre-supply concentration measuring unit 41. Accordingly, the TRO concentration of ballast water stored in the ballast tank 60 can be grasped. The concentration of the sterilizing component (TRO concentration) measured in this step is inputted to the determination unit 70A of the sterilization control unit 70. The second measurement step S4 may be performed continuously during a period in which the circulation step S3 is performed, or may be intermittently performed during a period in which the circulation step S3 is performed.

(Determination Step S5 of Measurement Data)

Next, it is determined whether or not the concentration of a sterilizing component (TRO concentration) measured in the above-mentioned second measurement step S4 is 0.2 times or more the concentration of the sterilizing component (TRO concentration) measured in the first measurement step S2. Specifically, the determination unit 70A of the sterilization control unit 70 determines whether or not inputted measurement data is 0.2 times or more the TRO concentration measured in the first measurement step S2 (determination step S5), and the determination result is inputted to the control unit 70B. When the TRO concentration measured in the second measurement step S4 is 0.2 times or more the TRO concentration measured in the first measurement step S2 (determination step S5: Yes), the control unit 70B finishes sterilization treatment of ballast water without additionally supplying a sterilizing component to ballast water (End). On the other hand, when the TRO concentration measured in the second measurement step S4 is less than 0.2 times the TRO concentration measured in the first measurement step S2 (determination step S5: NO), the control unit 70B performs the following second supply step S6.

(Second Supply Step S6)

In the second supply step S6, the control unit 70B performs a control so as to adjust a supply amount of sterilizing component supplied from the sterilizing component supply unit 40 to the ballast pipe 2 such that the TRO concentration measured by the post-supply concentration measuring unit 42 becomes 0.2 times or more and 0.5 times or less the TRO concentration measured in the first measurement step S2. Accordingly, the TRO concentration of ballast water stored in the ballast tank 60 can be increased and hence, it is possible to prevent plankton in ballast water in the ballast tank 60 from being activated again or it is possible to prevent plankton in an egg state from being proliferated again. In the second supply step S6, it is preferable that the above-mentioned control unit 70B performs a control so as to adjust a supply amount of a sterilizing component to be supplied from the sterilizing component supply unit 40 to the ballast pipe 2 such that the TRO concentration measured by the post-supply concentration measuring unit 42 becomes 0.22 times or more and 0.4 times or less the TRO concentration measured in the first measurement step S2. It is more preferable that the above-mentioned control unit 70B performs a control so as to adjust a supply amount of sterilizing component to be supplied from the sterilizing component supply unit 40 to the ballast pipe 2 such that the TRO concentration measured by the post-supply concentration measuring unit 42 becomes 0.25 times or more and 0.35 times or less the TRO concentration measured in the first measurement step S2.

The above-mentioned second supply step S6 is performed in a state where the period is not particularly limited provided that the second supply step S6 is performed after the first supply step S1 is performed and before ballast water is discharged to the outside. The second supply step S6 is preferably performed within 120 hours calculated backward from a scheduled ballast water discharge time. By performing the second supply step S6 at such timing, it is possible to prevent the TRO concentration of ballast water from being lowered again. Accordingly, it is possible to prevent the re-proliferation of microorganisms at the time of discharging ballast water.

From a viewpoint of preventing re-proliferation of microorganisms with certainty, timing at which the second supply step S6 is performed preferably fall within 48 hours before a scheduled water discharge time, and more preferably fall within 24 hours before the scheduled water discharge time. Further, it is preferable to perform the second supply step S6 at least 6 hours before the scheduled water discharge time. This is because the concentration of the sterilizing component in ballast water in the ballast tank 60 cannot be increased immediately after the second supply step S6 is started, and a fixed time is necessary for killing microorganisms by increasing the concentration of the sterilizing component.

As the reason that a supply amount of the sterilizing component supplied in the second supply step S6 is set to 0.2 times or more and 0.5 times or less the concentration of the sterilizing component supplied in the first supply step S1, the following two points are named.

(Reason 1) A sterilizing component supplied in the first supply step S1 is consumed by reacting with dissolved organic substance and dissolved ammoniacal substance contained in sea water. Accordingly, the concentration (TRO concentration) of the sterilizing component in ballast water after the first supply step S1 is finished is liable to be lowered with a lapse of time. Further, in the second supply step S2, the dissolved organic substance and the dissolved ammoniacal substance are already consumed and hence, the dissolved organic substance and the dissolved ammoniacal substance are minimally contained in ballast water. The sterilizing component is supplied to such ballast water and hence, the concentration (TRO concentration) of the sterilizing component in ballast water after the second supply step S2 is finished is hardly lowered. Accordingly, in the second supply step S6, it is sufficient to supply a minimum amount of the sterilizing component necessary for killing microorganisms existing in ballast water.

(Reason 2) In general, the inside of the ballast tank is a dark room to which light does not reach, and oxygen is not also supplied to the ballast tank. Accordingly, the inside of the ballast tank is disadvantageous for the growth of phytoplankton. When an amount of phytoplankton is small, an amount of zooplankton that feeds on phytoplankton is also decreased. When sea water is taken into the ballast tank 60 plural times, an amount of salt and a water temperature of ballast water are likely to be outside a range suitable for a growth of microorganisms. For this reason, plankton and bacteria minimally grow. Accordingly, it is considered that plankton and bacteria existing in ballast water in the ballast tank 60 are likely to be killed compared to plankton and bacteria existing in the sea water when sea water is taken into the ballast tank 60.

Due to the reasons set forth above, a supply amount of sterilizing component necessary for killing the microorganisms in the second supply step S6 can be set smaller than a supply amount of the sterilizing component necessary in the first supply step S1. Accordingly, it is preferable that the concentration of the sterilizing component contained in ballast water after the sterilizing component is supplied in the second supply step S6 be 2 mg/L or more and 4 mg/L or less. By setting the concentration of the sterilizing component contained in ballast water after the second supply step S6 is finished to 4 mg/L or less, a supply amount of sterilizing component can be reduced, and also corrosion of the ballast tank 60 and the ballast pipe 2 can be suppressed. It is preferable that the concentration of the sterilizing component contained in ballast water after the sterilizing component is supplied in the second supply step S6 be preferably 2.2 mg/L or more and 3.8 mg/L or less. It is more preferable that the concentration of a sterilizing component contained in ballast water after the sterilizing component is supplied in the second supply step S6 be preferably 2.5 mg/L or more and 3.5 mg/or less.

As in the case of the ballast water treatment method according to this embodiment, the concentration of the sterilizing component contained in ballast water which is stored in the ballast tank 60 is measured by the pre-supply concentration measuring unit 41, and the result of the measurement is fed back to the sterilizing component supply unit 40. Accordingly, a proper amount of sterilizing component can be supplied from the sterilizing component supply unit 40 to the ballast pipe 2 at timing that the concentration of the sterilizing component in ballast water becomes low (Specifically, the concentration of the sterilizing component becoming less than 0.2 times the concentration of the sterilizing component at the time of filling ballast water). Accordingly, the concentration of the sterilizing component contained in ballast water in the ballast tank 60 can be properly increased. As a result, it is possible to suppress reactivation and re-proliferation of plankton in ballast water in the ballast tank 60.

Second Embodiment

In the above-mentioned embodiment 1, the case has been described where the circulation step S3 is performed after the first measurement step S2 is finished. However, ballast water treatment method may include a step where the first supply step S1 and the first measurement step S2 are further repeated one time or more after the first measurement step S2 is finished and before the circulation step S3 is performed. By repeating the first supply step S1 and the first measurement step S2 one time or more respectively in this manner, it is possible to take a plurality of different sea waters into the ballast tank 60 as ballast water at different timings.

The actual operation of the ballast water treatment apparatus is not limited to the case where sea water is taken into the ballast tank 60 as ballast water at one port of a call. In many cases, sea water is taken into the ballast tank 60 as ballast water at two or more different ports of a call. According to the ballast water treatment method of this embodiment, even when sea water is taken into the ballast tank 60 as ballast water at two or more ports of a call, in the same manner as the case of the above-mentioned embodiment 1, it is possible to replenish a proper amount of sterilizing component at proper timing.

As in the case of this embodiment, when the first supply step S1 and the first measurement step S2 are respectively performed plural times, it is preferable that a specified first measurement step S2 be selected out of the plurality of first measurement steps S2, and an amount of a sterilizing component to be supplied in the second supply step S2 be decided based on the concentration of the sterilizing component measured in the selected first measurement step S2. Hereinafter, the description is made where an amount of the sterilizing component to be supplied in the second supply step is decided based on the concentration of the sterilizing component measured in the first measurement step S2 selected from the plurality of first measurement steps S2.

(1) Adjustment Based on Last First Measurement Step

In the second supply step S6, the concentration of the sterilizing component to be supplied may be adjusted based on the concentration of the sterilizing component measured in the last measurement step among the first measurement steps performed plural times. Specifically, the sterilizing component is supplied when the concentration of the sterilizing component measured in the second measurement step S4 is less than 0.2 times the concentration of the sterilizing component measured in the last first measurement step S2 among the plurality of first measurement steps S2. In the second supply step S6, the sterilizing component supply unit 40 may supply the sterilizing component to the ballast pipe 2 such that the concentration of the sterilizing component becomes 0.2 times or more and 0.5 times or less the concentration of the sterilizing component measured in the last first measurement step S2.

(2) Adjustment Based on First Measurement Step when a Take-in Amount is Maximum

In the second supply step S6, among first measurement steps performed plural times, the concentration of the sterilizing component to be supplied may be adjusted based on the concentration of the sterilizing component measured in the measurement step when a take-in amount of ballast water is the largest among the first measurement steps performed plural times. Specifically, the sterilizing component is supplied when the concentration of the sterilizing component measured in the second measurement step S4 is less than 0.2 times the concentration of the sterilizing component measured in the first measurement step S2 when a take-in amount of ballast water is largest among the plurality of first measurement steps S2. In the second supply step S6, the sterilizing component supply unit 40 may supply the sterilizing component to the ballast pipe 2 such that the concentration of the sterilizing component becomes 0.2 times or more and 0.5 times or less the concentration of the sterilizing component measured in the first measurement step S2 when the take-in amount of ballast water is largest.

(3) Adjustment Based on Maximum Value of Concentration of Sterilizing Component

In the second supply step S6, the concentration of the sterilizing component to be supplied may be adjusted based on a maximum value of the concentration of the sterilizing component measured in the first measurement steps performed plural times. Specifically, the sterilizing component is supplied when the concentration of the sterilizing component measured in the second measurement step S4 is less than 0.2 times a maximum value of the concentration of the sterilizing component measured in the plurality of first measurement steps S2. In the second supply step S6, the sterilizing component supply unit 40 may supply a sterilizing component to the ballast pipe 2 such that the concentration of the sterilizing component in ballast water flowing through the ballast pipe 2 becomes 0.2 times or more and 0.5 times or less of the maximum value.

(4) Adjustment Based on Minimum Value of Concentration of Sterilizing Component

In the second supply step S6, the concentration of the sterilizing component to be supplied may be adjusted based on a minimum value of the concentration of the sterilizing component measured in the first measurement steps performed plural times. Specifically, the sterilizing component is supplied when the concentration of the sterilizing component measured in the second measurement step S4 is less than 0.2 times a minimum value of concentration of the sterilizing component measured in the plurality of first measurement step S2. In the second supply step S6, the sterilizing component supply unit 40 may supply the sterilizing component to the ballast pipe 2 such that the concentration of the sterilizing component in a ballast water flowing through the ballast pipe 2 becomes 0.2 times or more and 0.5 times or less of the minimum value.

(5) Adjustment Based on all Sterilizing Component Concentrations

In the second supply step S6, the sterilizing component may be supplied such that the concentration of the sterilizing component becomes 0.2 times or more and 0.5 times or less all sterilizing component concentrations measured in the first measurement steps performed plural times. Specifically, when the first supply step S1 is performed plural times, the concentration of the sterilizing component is adjusted such that the TRO concentration becomes 6 mg/L or more and 10 mg/L or less in any first supply steps S1. Accordingly, in the second supply step S6, when the sterilizing component is supplied such that the TRO concentration is 2 mg/L or more and 3 mg/L or less, the concentration of the sterilizing component becomes 0.2 times or more and 0.5 times or less the concentration of the sterilizing component measured in the first measurement step S2. That is, in the second supply step S6, the sterilizing component is supplied such that the concentration of the sterilizing component becomes 0.2 times or more and 0.5 times or less all sterilizing concentrations measured in the first supply step S1 performed plural times. In this case, it is possible to set a concentration ratio of the sterilizing component within a predetermined range even when a minimum value and a maximum value of the concentration of the sterilizing component measured in the first measurement step are not controlled intentionally.

<Modification>

Figure 4:
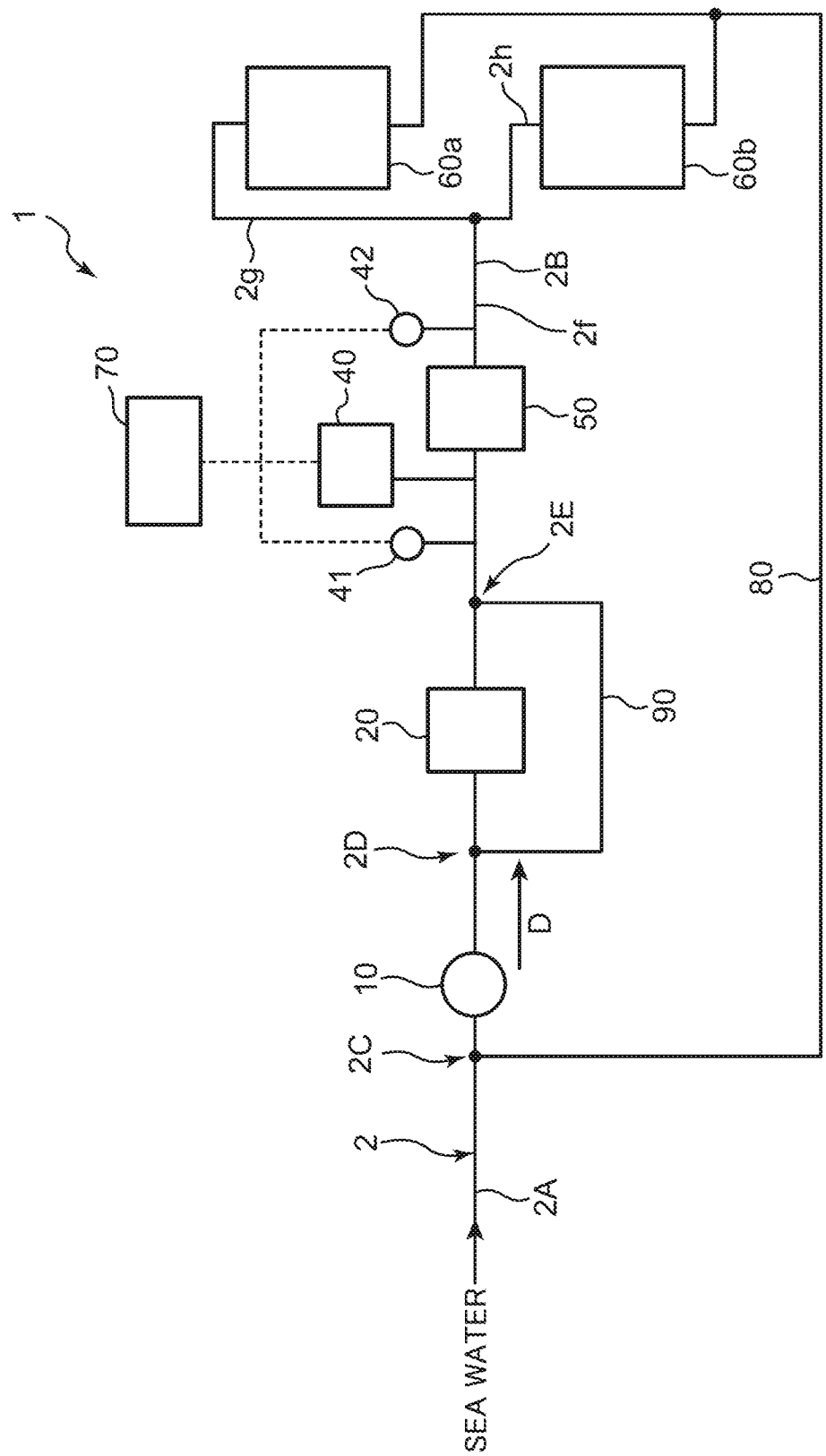
FIG. 4 is a schematic view of a modification of the ballast water treatment apparatus shown in FIG. 1.

The ballast water treatment apparatus 1 according to the embodiment 1 includes one ballast tank 60. However, the ballast water treatment apparatus 1 may include two or more ballast tanks 60. The ballast water treatment apparatus shown in FIG. 4 differs from the ballast water treatment apparatus shown in FIG. 1 in that the ballast water treatment apparatus has two ballast tanks. However, other configurations are equal to the corresponding configurations of the embodiment 1.

The position and the weight of a cargo loaded on a ship are changed each time the ship arrives at a port of a call. Accordingly, it is necessary to adjust a weight of the ballast water stored in the ballast tank 60 corresponding to the position and weight of the cargo. In this case, as described in the modification shown in FIG. 4, the ballast water treatment apparatus has two ballast tanks (first ballast tank 60a and second ballast tank 60b). Accordingly, corresponding to a stacking position of a cargo, it is possible to make ballast flow from one ballast tank (for example, first ballast tank 60a) to another ballast tank (for example, second ballast tank 60b) and hence, a hull can maintain a balance. The first ballast tank 60a and the second ballast tank 60b are connected to the ballast pipe 2, respectively. Although illustrated, the ballast water treatment apparatus includes a switching mechanism which switches whether ballast water (sea water) flowing through the ballast pipe 2 is allowed to enter the first ballast tank 60a or the second ballast tank 60b.

The ballast pipe 2 includes: a main pipe 2f on which a ballast pump 10, a pre-supply concentration measuring unit 41, a sterilizing component supply unit 40 and a post-supply concentration measuring unit 42 are mounted; a first branch pipe 2g which connects the main pipe 2f and the first ballast tank 60a to each other; and a second branch pipe 2h which connects the main pipe 2f and the second ballast tank 60b to each other. The switching mechanism includes, for example, an on-off valve mounted on the first branch pipe 2g, and an on-off valve mounted on the second branch pipe 2h. In this modification, the case where the ballast water treatment apparatus includes two ballast tanks is illustrated. However, the ballast water treatment apparatus may include three or more ballast tanks.

In this modification, adjustment of the concentration of a sterilizing component is performed in the same manner as the above-mentioned embodiment for respective ballast tanks 60a and 60b. For example, when the concentration of a sterilizing component in ballast water stored in the first ballast tank 60a is adjusted, the concentration of the sterilizing component is adjusted in the same manner as the embodiment by circulating ballast water stored in the first ballast tank 60a between the first ballast tank 60a and the ballast pipe 2. At this stage of the operation, ballast water stored in the second ballast tank 60b is not circulated. On the other hand, when the concentration of the sterilizing component in ballast water stored in the second ballast tank 60b is adjusted, the concentration of the sterilizing component is adjusted in the same manner as the embodiment by circulating the ballast water stored in the second ballast tank 60b between the second ballast tank 60b and the ballast pipe 2.

EXAMPLES

Example 1

In Example 1, firstly, two kinds of sea waters of 100 m$^3$ respectively which were collected at two different sea areas using the ballast water treatment apparatus 1 shown in FIG. 1 were taken into the ballast tanks 60 having a capacity of approximately 300 m$^3$ respectively as ballast water.

Specifically, sea water (hereinafter also referred to as "ballast water") having a volume of 100 m$^3$ was taken into the ballast tank 60 at a flow rate of 50 m$^3$/hour from the pipe port 2A of the ballast pipe 2 by a pumping pressure of the ballast pump 10. By allowing ballast water to pass through the filter 20, large microorganisms (including large plankton) and particles in ballast water were removed.

A solution containing a sterilizing component of 6,500 mg-TRO/L (in terms of C12: being applicable hereinafter in the same manner) was injected from the sterilizing component supply unit 40 into ballast water flowing through the ballast pipe 2 after the ballast water was filtered by the filter 20 at a flow rate of 1 L/min (First supply step S1). The solution containing the sterilizing component was a solution obtained by dissolving sodium dichloroisocyanurate dihydrate having an effective chlorine concentration of 55% into fresh water.

Next, the concentration of the sterilizing component contained in ballast water was made uniform by stirring the ballast water containing the sterilizing component by the mixer 50. Then, the concentration (TRO concentration) of the sterilizing component contained in ballast water after the ballast water passed through the mixer 50 was measured by the post-supply concentration measuring unit 42. As a result (first measurement step S2), the concentration of the sterilizing component was 6.5 mg-TRO/L on average. As the post-supply concentration measuring unit 42, a DPD-type chlorimeter II (manufactured by HACH) was used. Information of the measured TRO concentration was inputted to the sterilization control unit 70.

The ballast water of 100 m$^3$ in the above-mentioned ballast tank 60 was held for 120 hours. Thereafter, sea water of 100 m$^3$ was obtained from different sea region, and the sea water was filled in the ballast tank 60 in the same manner as the above-mentioned first supply step S1 and the above-mentioned first measurement step S2. The TRO concentration of ballast water measured in the first measurement step S1 performed at a second time was 6.2 mg-TRO/L on average. Information on the TRO concentration measured in such a step was inputted to the sterilization control unit 70.

In the above-mentioned ballast water treatment method, the conditions (treatment flow rate and treatment amount) of the respective first supply steps S1 and the concentrations of the sterilizing components measured in the respective first measurement steps S2 are respectively shown in following Table 1. Ballast water stored in the above-mentioned ballast tank 60 was held for 120 hours and thereafter, ballast water was sampled from the ballast tank 60.

Next, the ballast water stored in the ballast tank 60 was returned to the ballast pipe 2 via the circulation pipe 80 at a flow rate of 10 m$^3$/hour. The ballast water returned to the ballast pipe 2 bypassed the filter 20 by flowing through the bypass pipe 90, and was returned to the ballast pipe 2 from the bypass pipe 90 (circulation step S3). The concentration (TRO concentration) of the sterilizing component contained in ballast water flowing through the ballast pipe 2 was measured by the pre-supply concentration measuring unit 41 (second measurement step S4). As a result, the concentration of the sterilizing component contained in ballast water on average was 0.2 mg-TRO/L. Information on the TRO concentration measured in such a step was inputted to the sterilization control unit 70.

The sterilization control unit 70 controlled a supply amount of a solution containing a sterilizing component from the sterilizing component supply unit 40 to the ballast pipe 2 based on the respective TRO concentrations measured by the above-mentioned pre-supply concentration measuring unit 41 and the post-supply concentration measuring unit 42 (second supply step S6). Specifically, the sterilization control unit 70 controlled an amount of the sterilizing component supplied from the sterilizing component supply unit 40 to the ballast pipe 2 to 1.8 mg-TRO/L such that the TRO concentration of the ballast water measured by the post-supply concentration measuring unit 42 becomes 2.0 mg-TRO/L.

After the ballast water after the supply of the sterilizing component was stirred by the mixer 50, the TRO concentration of the ballast water was measured by the post-supply concentration measuring unit 42. As a result, the average TRO concentration of the ballast water after passing through the mixer 50 was 2.0 mg-TRO/L. This concentration corresponds to 0.31 times the TRO concentration measured in the first measurement step S2 of the first time, and corresponds to 0.32 times the TRO concentration measured in the first measurement step S2 of the second time. A sterilizing component was supplied to the ballast water by circulating the ballast water at the above flow rate for 20 hours. After this circulation of the ballast water was finished, the ballast water stored in the ballast tank 60 was sampled. This sample is referred to as a "sample after the second supply step". The hull did not lose its balance during the above-mentioned ballast water circulation operation.

"concentration of the sterilizing component" in "second measurement step" respectively mean the concentrations of the sterilizing components measured in the first and second measurement steps respectively. "magnification of second measurement step/each first measurement step" in Table 1 is a magnification obtained by dividing the concentration of the sterilizing component measured in the second measurement step by the concentration of the sterilizing component measured in each first measurement step.

Example 2

Example 2 differs from Example 1 in the following points. However, ballast water was treated in the same manner as Example 1 with respect to other points.

In the first supply step, the capacity of the ballast tank 60 was changed to 1000 m³, and the first supply step and the first measurement step were respectively performed three times under conditions "treatment flow rate" and "take-in amount" shown in Table 1 described above. By alternately performing the first supply step and the first measurement step three times respectively, sea water (ballast water) was taken into the ballast tank 60 three times. The first supply step of second time started 20 hours later after the first supply step of the first time was finished, and the first supply step of the third time started 54 hours later after the first supply step of the second time was finished.

In the first measurement step and the second measurement step, the TRO concentrations indicated in a column "first measurement step" and a column "second measurement step" in Table 1 were measured respectively.

In the second supply step, the sterilization control unit 70 controlled a supply amount of sterilization solution supplied to the ballast pipe 2 from the sterilizing component supply unit 40 to 0.9 mg-TRO/L so that the TRO concentration of the ballast water measured by the post-supply concentration measuring unit 42 was adjusted to 2.0 mg-TRO/L. As a result, the TRO concentration on average measured by the post-supply concentration measuring unit 42 was 2.0 mg-TRO/L. This concentration corresponds to 0.31 times the TRO concentration measured in the first measurement step of the first time, corresponds to 0.27 times the TRO concentration measured in the first measurement step of the

TABLE 1

| | FIRST SUPPLY STEP | | | | | | CONCENTRATION OF STERILIZING COMPONENT (mg-TRO/L) | | | | | MAGNIFICATION OF AFTER-SECOND MEASUREMENT STEP/EACH FIRST MEASUREMENT STEP (TIMES) | | |
|---|---|---|---|---|---|---|---|---|---|---|---|---|---|---|
| | TREATMENT FLOW RATE (m³/HOUR) | | | TAKE-IN AMOUNT (m³) | | | FIRST MEASUREMENT STEP | | | SECOND MEASUREMENT STEP | | | | |
| | FIRST TIME | SECOND TIME | THIRD TIME | FIRST TIME | SECOND TIME | THIRD TIME | FIRST TIME | SECOND TIME | THIRD TIME | BEFORE STEP | AFTER STEP | FIRST TIME | SECOND TIME | THIRD TIME |
| EXAMPLE 1 | 50 | 50 | — | 100 | 100 | — | 6.5 | 6.2 | — | 0.2 | 2 | 0.31 | 0.32 | — |
| EXAMPLE 2 | 250 | 450 | 500 | 240 | 320 | 350 | 6.4 | 7.3 | 8.1 | 1.1 | 2 | 0.31 | 0.27 | 0.25 |
| EXAMPLE 3 | 250 | — | — | 200 | — | — | 9.5 | — | — | 0.6 | 2.9 | 0.32 | — | — |
| EXAMPLE 4 | 50 | 50 | — | 100 | 100 | — | 6.5 | 6.2 | — | 0.2 | 2.9 | 0.45 | 0.47 | — |
| COMPARATIVE EXAMPLE 1 | 50 | 50 | — | 100 | 100 | — | 4.5 | 4.3 | — | >0.1 | 2.8 | 0.62 | 0.65 | — |
| COMPARATIVE EXAMPLE 2 | 50 | 50 | — | 100 | 100 | — | 6.5 | 6.2 | — | 0.2 | 3.4 | 0.52 | 0.55 | — |
| COMPARATIVE EXAMPLE 3 | 50 | 50 | — | 100 | 100 | — | 6.5 | 6.2 | — | 0.2 | 1.2 | 0.18 | 0.19 | — |

"1 to 3 times" in the above Table 1 means the number of treatments. For example, in Example 1, since the numerical value was filled in up to the second time. This means that the first supply step S1 and the first measurement step S2 were respectively performed twice. "Treatment flow rate" in Table 1 is a flow rate of ballast water when ballast water was taking-in in the first supply step S1, and "take-in amount" in the table is a volume of a ballast water taken into the ballast tank in the first supply step S1. In Table 1, "concentration of the sterilizing component" in "first measurement step" and second time, and corresponds to 0.25 times the TRO concentration measured in the first measurement step of the third time. Under these conditions, ballast water was circulated for 9 hours. As a result, the TRO concentration measured by the pre-supply concentration measuring unit 41 became 2.0 mg-TRO/L on average.

Example 3

Example 3 differs from Example 1 in the following points. However, ballast water was treated in the same manner as Example 1 with respect to other points.

In the first supply step, the TRO concentration of a solution containing a sterilizing component supplied to the ballast pipe was changed to 9.5 mg-TRO/L.

In the first measurement step and the second measurement step, the TRO concentrations indicated in a column "first measurement step" and a column "second measurement step" in Table 1 were measured respectively.

In the circulation step, ballast water was circulated through the circulation pipe 80 at a flow rate of 200 m³/hour.

In the second supply step, the sterilization control unit 70 controls a supply amount of sterilization solution supplied to the ballast pipe 2 from the sterilizing component supply unit 40 to 2.4 mg-TRO/L/min so that the TRO concentration of the ballast water measured by the post-supply concentration measuring unit 42 became 3.0 mg-TRO/L. As a result, the TRO concentration on average measured by the post-supply concentration measuring unit 42 was 2.9 mg-TRO/L. This concentration corresponds to 0.32 times the TRO concentration measured in the first measurement step of the first time. Under these conditions, ballast water was circulated for 1 hour. As a result, the TRO concentration measured by the pre-supply concentration measuring unit 41 became 3.0 mg-TRO/L on average.

Example 4

Example 4 differs from Example 1 in that an amount of a sterilizing component supplied in a second supply step was changed. However, ballast water was treated by the sterilization treatment in the same manner as Example 1. That is, in the second supply step of Example 4, the sterilization control unit 70 controlled a supply amount of sterilization solution to be supplied from the sterilizing component supply unit 40 to the ballast pipe 2 to 2.7 mg-TRO/L/min so that the TRO concentration of the ballast water measured by the post-supply concentration measuring unit 42 became 2.9 mg-TRO/L. As a result, the TRO concentration on average measured by the post-supply concentration measuring unit 42 was 2.9 mg-TRO/L. This concentration corresponds to 0.45 times the TRO concentration measured in the first measurement step of the first time, and corresponds to 0.47 times the TRO concentration measured in the first measurement step S2 of the second time. Under these conditions, ballast water was circulated for 9 hours. As a result, the TRO concentration measured by the pre-supply concentration measuring unit 41 became 2.9 mg-TRO/L on average.

Comparative Example 1

Comparative Example 1 differs from Example 1 in the following points. However, ballast water is treated by sterilization treatment in the same manner as in Example 1 with respect to other points.

In the first supply step, the TRO concentration of a solution containing a sterilizing component supplied to the ballast pipe was changed from 6,500 mg-TRO/L to 4,500 mg-TRO In the first measurement step, the TRO concentration indicted in a column "First measurement step" in Table 1 was measured.

In the second measurement step, the concentration of the sterilizing component (TRO concentration) contained in ballast water stored in the ballast tank 60 could not be measured. From this result, it is safe to say that the TRO concentration of the ballast water stored in the ballast tank 60 was less than 0.1 mg-TRO/L.

In the second supply step, the sterilization control unit 70 controlled an amount of a sterilizing component supplied from the sterilizing component supply unit 40 to the ballast pipe 2 to 3.0 mg-TRO/L/min such that the TRO concentration of ballast water measured by the post-supply concentration measuring unit 42 became 2.8 mg-TRO/L. As a result, the TRO concentration on average measured by the post-supply concentration measuring unit 42 was 2.8 mg-TRO/L. This concentration corresponds to 0.62 times the TRO concentration measured in the first measurement step of first time, and corresponds to 0.65 times the TRO concentration measured in the first measurement step of second time.

Comparative Example 2

Comparative Example 2 differs from Example 1 in that an amount of a sterilizing component to be supplied in a second supply step was changed. However, ballast water was treated in the same manner as Example 1. That is, in the second supply step of Comparative Example 2, the sterilization control unit 70 controlled a supply amount of sterilization solution supplied to the ballast pipe 2 from the sterilizing component supply unit 40 to 3.2 mg-TRO/L/min so that the TRO concentration of ballast water measured by the post-supply concentration measuring unit 42 was adjusted to 3.4 mg-TRO/L. As a result, the TRO concentration on average measured by the post-supply concentration measuring unit 42 was 3.4 mg-TRO/L. This concentration corresponds to 0.52 times the TRO concentration measured in the first measurement step of the first time, and corresponds to 0.54 times the TRO concentration measured in the first measurement step S2 of the second time. Under these conditions, ballast water was circulated for 9 hours. As a result, the TRO concentration measured by the pre-supply concentration measuring unit 41 became 3.4 mg-TRO/L on average.

Comparative Example 3

Comparative Example 3 differs from Example 1 in that an amount of a sterilizing component to be supplied in a second supply step was changed. However, ballast water was treated in the same manner as Example 1. That is, in the second supply step of Comparative Example 3, the sterilization control unit 70 controlled a supply amount of sterilization solution supplied to the ballast pipe 2 from the sterilizing component supply unit 40 to 1.1 mg-TRO/L/min so that the TRO concentration of ballast water measured by the post-supply concentration measuring unit 42 was adjusted to 1.3 mg-TRO/L. As a result, the TRO concentration on average measured by the post-supply concentration measuring unit 42 was 1.3 mg-TRO/L. This concentration corresponds to 0.18 times the TRO concentration measured in the first measurement step of the first time, and corresponds to 0.19 times the TRO concentration measured in the first measurement step of the second time. Under these conditions, ballast water was circulated for 9 hours. As a result, the TRO concentration measured by the pre-supply concentration measuring unit 41 became 1.3 mg-TRO/L on average.

Reference Example

Consider the case where 100 m³ of sea water was taken into the ballast tank 60 under the same conditions as Example 1. In this case, to completely eliminate the existence of organisms having a minimum diameter of 10 μm or more and less than 50 μm in ballast water even when 240 hours elapse after ballast water was taken into the ballast tank 60, it was necessary to set the TRO concentration of ballast water at the time of filling ballast water to 30 mg/L or more.

On the other hand, in Example 1, to completely eliminate the existence of organisms having a minimum diameter of 10 μm or more and less than 50 μm in ballast water, it was sufficient to set the TRO concentration of the ballast water measured in the first measurement step to 6.5 mg/L on average, 6.2 mg/L on average and to set the TRO concentration of ballast water after the second supply step to 2.1 mg/L. From this, it becomes apparent that the treatment method of Example 1 can kill bacteria and plankton by adding a smaller amount of a sterilizing component, as compared with the treatment method of Reference Example.

From the comparison between Example 1 and Reference Example, it becomes apparent that bacteria and plankton can be sufficiently killed while reducing an amount of sterilizing component to be used by additionally supplying a sterilizing component at timing the concentration of a sterilizing component becomes low other than a water filling time, compared to the case where a sterilizing component is supplied only at the time of filling water.

(Evaluation)

In respective Examples and respective Comparative Examples, the number of living organisms (microorganisms having a minimum diameter of 10 μm or more and less than 50 μm) contained in ballast water samples before and after the second supply step was performed were measured three times respectively, and the averages of the number of living organisms were calculated. Further, the numbers of heterotrophic bacteria (sea water medium) contained in ballast water sample before and after the second supply step was performed were measured. The results of these measurements are shown in Table 2 below. In Table 2, the majority of existing organisms confirmed in ballast water before the second supply step was performed were individuals immediately after hatching. In the sample of Comparative Example 1 after the second supply step was performed, an average of 7 and a maximum of 11 living organisms were inhabited In Table 2, the "plankton number" is the number of plankton individuals having a minimum diameter of 10 μm or more and less than 50 μM contained in 1 mL of ballast water.

(Result)

From the comparison of data on the plankton number and data on the bacteria number in data of "before the second supply step" and "after the second supply step" in Table 2 described above, it becomes apparent that the number of plankton and the number of bacteria in ballast water can be significantly reduced by supplying a sterilizing component to ballast pipe 2 such that the concentration of the sterilizing component contained in ballast water after the sterilizing component is supplied in the first supply step is 6 mg/L, and the concentration of the sterilizing component contained in ballast water which flows through the ballast pipe 2 is 0.2 times or more the concentration of the sterilizing component measured in the first measurement step S2. Further, it also becomes apparent that the re-activation and re-proliferation of plankton in ballast water can be prevented with a smaller amount of sterilizing component than prior art by supplying the sterilizing component to the ballast pipe 2 such that the concentration of the sterilizing component contained in ballast water flowing through the ballast pipe 2 is 0.5 times or less the concentration of the sterilizing component measured in the first measurement step S2.

In Comparative Example 2, the concentration of the sterilizing component contained in ballast water flowing through the ballast pipe 2 exceeded 0.5 times the concentration of the sterilizing component measured in the first measurement step S2. The number of plankton and the number of bacteria after the second supply step were at the same level as in Example 4. On the other hand, in Comparative Example 2, the concentration of the sterilizing component when ballast water was discharged was excessively high and hence, a required amount of neutralizing agent for neutralizing the sterilizing component contained in ballast water increased.

In Comparative Example 3, the concentration of the sterilizing component contained in ballast water flowing through the ballast pipe 2 was less than 0.2 times the concentration of the sterilizing component measured in the first measurement step S2 and hence, an amount of the sterilizing component contained in ballast water was insufficient. Accordingly, plankton were re-proliferated in ballast water stored in the ballast tank.

In Comparative Example 1, the concentration of the sterilizing component supplied in the first supply step was

TABLE 2

| | BEFORE SECOND SUPPLY STEP | | AFTER SECOND SUPPLY STEP | |
|---|---|---|---|---|
| | THE NUMBER OF PLANKTONS (INDIVIDUAL/mL) | THE NUMBER OF BACTERIA (CFU/cc) | THE NUMBER OF PLANKTONS (INDIVIDUAL/mL) | THE NUMBER OF BACTERIA (CFU/cc) |
| EXAMPLE 1 | 15 | $3.4 \times 10^3$ | 0 | $2.1 \times 10^1$ |
| EXAMPLE 2 | 1 | $7.4 \times 10^0$ | 0 | $2.7 \times 10^0$ |
| EXAMPLE 3 | 3 | $4.1 \times 10^2$ | 0 | 0 |
| EXAMPLE 4 | 15 | $3.4 \times 10^3$ | 0 | $1.6 \times 10^1$ |
| COMPARATIVE EXAMPLE 1 | 80 | $6.2 \times 10^5$ | 7 | $4.2 \times 10^1$ |
| COMPARATIVE EXAMPLE 2 | 15 | $3.4 \times 10^3$ | 0 | $1.5 \times 10^1$ |
| COMPARATIVE EXAMPLE 3 | 15 | $3.4 \times 10^3$ | 5 | $1.7 \times 10^3$ | less than 6 mg/L and hence, the number of plankton and the number of bacteria in ballast water could not be reduced.

In Examples 1 and 2, the concentration of the sterilizing component measured in the second measurement step S4 was less than 0.2 times the concentration of the sterilizing component measured in the last first measurement step S2 among the plurality of first measurement steps S2. For this reason, in the second supply step S6, the sterilizing component was supplied to the ballast pipe 2 such that the concentration of the sterilizing component was 0.2 times or more and 0.5 times or less the concentration of the sterilizing component measured in the last first measurement step S2. As in Examples 1 and 2, by setting an amount of sterilizing component to be additionally supplied based on the concentration of the sterilizing component measured in the last first measurement step S2, plankton and bacteria in ballast water were killed more effectively. Further, it was unnecessary to excessively use a neutralizing agent.

In Examples 1 and 2, the concentration of the sterilizing component measured in the second measurement step S4 was less than 0.2 times the concentration of the sterilizing component measured in the first measurement step S2 when a take-in amount of ballast water was largest among the plurality of first measurement steps S2. For this reason, in the second supply step S6, the sterilizing component was supplied to the ballast pipe 2 such that the concentration of the sterilizing component was 0.2 times or more and 0.5 times or less the concentration of the sterilizing component measured in this first measurement step S2.

As in Examples 1 and 2, by setting the amount of sterilizing component to be additionally supplied, based on the concentration of the sterilizing component measured in the first measurement step S2 when the take-in amount of ballast water was the largest, plankton and bacteria in ballast water were killed more effectively.

In Examples 1 and 2, the concentration of the sterilizing component measured in the second measurement step S4 was less than 0.2 times the maximum value of the concentration of the sterilizing component measured in the plurality of first measurement steps S2. Therefore, in the second supply step S6, the sterilizing component was supplied to the ballast pipe 2 such that the concentration of the sterilizing component in ballast water flowing through the ballast pipe 2 was 0.2 times or more and 0.5 times or less of the maximum value.

As in Examples 1 and 2, by setting the amount of sterilizing component to be additionally supplied based on the maximum value of the concentrations of the sterilizing components measured in the plurality of first measurement steps S2, plankton and bacteria in ballast water were killed more effectively.

In Examples 1 and 2, the concentration of the sterilizing component measured in the second measurement step S4 was less than 0.2 times the minimum value of the concentration of the sterilizing component measured in the plurality of first measurement steps S2. For this reason, in the second supply step S6, the sterilizing component was supplied to the ballast pipe 2 such that the concentration of the sterilizing component in ballast water flowing through the ballast pipe 2 became 0.2 times or more and 0.5 times or less of the minimum value.

As in the case of Examples 1 and 2, by setting an amount of sterilizing component to be additionally supplied based on the minimum value among the concentrations of the sterilizing components measured in the plurality of first measurement steps S2, plankton and bacteria in ballast water were killed more effectively.

From the above results, by returning the ballast water in the ballast tank 60 to the ballast pipe 2 via the circulation pipe 80, and additionally supplying the sterilizing component from the sterilizing component supply unit 40 in an appropriate amount, both plankton and microorganisms in ballast water can be killed with a smaller amount of the sterilizing component. Further, an operation control can be performed only based on the concentration of a sterilizing component without measuring and controlling the number of plankton. Further, by adopting a control method where additional supply of a sterilizing component is determined based on a ratio of a concentration measured value of a sterilizing component after sterilizing treatment measured in the second measurement step relative to a concentration measured value of a sterilizing component initially supplied and measured in the first measurement step, an amount of sterilizing component to be added and addition timing can be effectively controlled.

It should be construed that the embodiments disclosed in this specification are illustrative in all aspects, and are not limitative. The scope of the present invention is not defined by the above-mentioned description but is defined by the scope of claims, and it is intended that the scope of the present invention includes all modifications within the meaning and the scope equivalent to the claims.

The above-mentioned embodiment is recapitulated below.

(1) The ballast water treatment method according to the embodiment includes: a first supply step of supplying a sterilizing component to a ballast pipe while taking ballast water into a ballast tank through the ballast pipe; a first measurement step of measuring concentration of the sterilizing component in the ballast water after the sterilizing component is supplied; a circulation step of returning the ballast water stored in the ballast tank to the ballast pipe through a circulation pipe connected to the ballast tank before the ballast water stored in the ballast tank is discharged; a second measurement step of measuring the concentration of the sterilizing component contained in the ballast water returned to the ballast pipe; and a second supply step of supplying the sterilizing component to the ballast pipe such that, when the concentration of the sterilizing component measured in the second measurement step is less than 0.2 times the concentration of the sterilizing component measured in the first measurement step, the concentration of the sterilizing component contained in the ballast water flowing through the ballast pipe becomes 0.2 times or more and 0.5 times or less the concentration of the sterilizing component measured in the first measurement step. In the first supply step, the sterilizing component is supplied to the ballast pipe such that the concentration of the sterilizing component measured in the first measurement step becomes 6 mg/L or more.

According to the ballast water treatment method of the embodiment, the sterilizing component is supplied to the ballast pipe in the first supply step such that the concentration of the sterilizing component becomes 6 mg/L or more. In this embodiment, it is preferable to use the residual oxidant concentration (TRO: Total Residual Oxidant) in ballast water as the concentration of a sterilizing component. As a method for measuring the TRO concentration, a measurement method based on a colorimetric method using a DPD (N, N-diethylparaphenylenediamine) reagent or the like can be used. By supplying the sterilizing component to the ballast water at the above concentration, microorganisms existing in ballast water can be effectively killed.

In ballast water treatment method of the embodiment, it is essential that the concentration of the sterilizing component contained in ballast water returned to the ballast pipe in the circulation step is 0.2 times or more and 0.5 times or less the concentration in the first measurement step when such concentration of the sterilizing component becomes less than 0.2 times the concentration of the sterilizing component when the ballast water is taken in (hereinafter referred to as "concentration of sterilizing component at the time of filling ballast water"). In addition to killing microorganisms in ballast water by supplying a sterilizing component to ballast water during filling ballast water, it is possible to create an environment in which plankton in ballast water hardly exist. By exposing plankton to this environment, plankton can be weakened. By setting the concentration of a sterilizing component contained in ballast water to 0.2 times or more the concentration of the sterilizing component at the time of filling before discharging the ballast water, it is possible to completely kill plankton which is in a state of asphyxia without being completely killed in the sterilizing component supplied in the first supply step, and it is also possible to kill plankton that has grown and hatched in a state of eggs in the first supply step. On the other hand, by setting the concentration of the sterilizing component to 0.5 times or less the concentration of the sterilizing component at the time of filling water, it is possible to suppress an excessive amount of sterilizing component from being injected into ballast water. Accordingly, the wasteful use of sterilizing components can be reduced, and it is also possible to prevent am amount of neutralizing agent necessary for neutralizing a sterilizing component contained in ballast water from becoming excessively large when ballast water is discharged from the ballast tank.

According to the ballast water treatment method of the embodiment, when the concentration of the sterilizing component contained in ballast water stored in the ballast tank becomes less than 0.2 times the concentration of the sterilizing component at the time of filling ballast water, the sterilizing component is supplied to ballast water. Therefore, plankton and bacteria in ballast water can be effectively killed while reducing the total amount of sterilizing components to be supplied to the ballast water, as compared with the case where the sterilizing components are supplied collectively at the time of filling ballast water.

Compared to a conventional ballast water treatment method, the ballast water treatment method of the above-described embodiment can be implemented by merely adding simple equipment. That is, the ballast water treatment method can be implemented by newly providing a circulation pipe to the ballast tank. Accordingly, a ship which cannot secure a device installation space can easily adopt the abovementioned ballast water treatment method.

(2) The method of the embodiment is not limited to the case where ballast water is filled in a sea area of one port, but can be applied to the case where ballast water is filled in a plurality of ports. That is, in the method of the embodiment, the first supply step and the first measurement step may be performed one or more times after the first measurement step is finished and before the circulation step is performed. By performing the first supply step and the first measurement step a plurality of times, ballast water can be taken in a plurality of sea areas. Even when ballast water is taken into a ballast tank in a plurality of sea areas, an appropriate amount of a sterilizing component can be supplied corresponding to an amount of ballast water taken into the ballast tank.

(3) In the method of the embodiment, when the concentration of a sterilizing component measured in the second measurement step is 0.2 times or more and 0.5 times or less the concentration of the sterilizing component measured in the last first measurement step among the plurality of first measurement steps, in the second supply step, the sterilizing component may be supplied to the ballast pipe such that the concentration of the sterilizing component be 0.2 times or more and 0.5 times or less the concentration of the sterilizing component measured in the last first measurement step.

It is considered that the concentration of the sterilizing component measured in the last first measurement step of the plurality of first measurement steps easily affects the concentration of the sterilizing component contained in ballast water stored in the ballast tank. Accordingly, by setting an amount of sterilizing component to be additionally supplied to ballast water based on the concentration of the sterilizing component measured in the last first measurement step, microorganisms in ballast water can be more effectively killed.

(4) When the concentration of the sterilizing component measured in the second measurement step is less than 0.2 times the concentration of the sterilizing component measured in the first measurement step where a take-in amount of ballast water is largest among the plurality of first measurement steps, in the second supply step, the sterilizing component may be supplied to the ballast pipe such that the concentration of the sterilizing component become 0.2 times or more and 0.5 times or less the concentration of the sterilizing component measured in the first measurement step where the take-in amount of ballast water is largest.

It is considered that the concentration of the sterilizing component measured in the first measurement step where a take-in amount of ballast water is largest among the plurality of first measurement steps easily affects the concentration of the sterilizing component contained in ballast water stored in the ballast tank. For this reason, based on the concentration of the sterilizing component measured in the first measurement step when the amount of ballast water taken in is the largest, by setting the amount of sterilizing component to be additionally supplied, the microorganisms in ballast water can be further reduced.

(5) When the concentration of the sterilizing component measured in the second measurement step is less than 0.2 times the a maximum value of the concentration of the sterilizing component measured in the plurality of first measurement steps, in the second supply step, the sterilizing component may be supplied to the ballast pipe such that the concentration of the sterilizing component in ballast water flowing through the ballast pipe become 0.2 times or more and 0.5 times or less the maximum value.

It is considered that a maximum value of the concentration of the sterilizing component measured in the plurality of first measurement steps easily affects the concentration of the sterilizing component contained in ballast water stored in the ballast tank. Accordingly, by setting an amount of sterilizing component to be additionally supplied to ballast water based on a maximum value of the concentration of the sterilizing component measured in the plurality of first measurement steps, microorganisms in ballast water can be more effectively killed.

(6) In the first supply step, the sterilizing component may be supplied to the ballast pipe such that the concentration of the sterilizing component measured in the first measurement step becomes 10 mg/L or less. In this case, when the concentration of the sterilizing component measured in the second measurement step is less than 0.2 times a minimum value of the concentration of the sterilizing component measured in the plurality of first measurement steps, in the second supply step, the sterilizing component may be supplied to the ballast pipe such that the concentration of the sterilizing component in ballast water flowing through the ballast pipe become 0.2 times or more and 0.5 times or less all sterilization concentration measured in the plurality of first measurement step.

In the first supply step, a sterilizing component is supplied such that the concentration of the sterilizing component becomes 6 to 10 mg/L. Accordingly, in the second supply step, by supplying a sterilizing component such that the concentration becomes 2 to 3 mg/L, the concentration of the sterilizing component becomes 0.2 times or more and 0.5 times or less the concentration of the sterilizing component measured in the first measurement step. In other words, even if the minimum and maximum concentrations of the sterilizing component measured in the first measurement step are not controlled, the sterilizing component is supplied such that the concentration becomes 2-3 mg/L in the second supplying step, so that the concentration can be adjusted to 0.2 times or more and 0.5 times or less. Accordingly, time and efforts necessary for adjusting the concentration of the sterilizing component can be reduced.

According to the embodiment, it is possible to provide a ballast water treatment method capable of killing both bacteria and planktons, which are microorganisms in ballast water, with a smaller amount of sterilizing component than prior art.

The invention claimed is:

1. A ballast water treatment method, comprising:
   (a) supplying a sterilizing component to a ballast pipe while taking ballast water into a ballast tank through the ballast pipe;
   (b) measuring a concentration of the sterilizing component in the ballast water after the sterilizing component is supplied to the ballast pipe, the concentration of the sterilizing component being input into a storage unit of a sterilization control unit;
   (c) returning the ballast water stored in the ballast tank and circulating the ballast water between the ballast tank and the ballast pipe to the ballast pipe through a circulation pipe connected to the ballast tank before the ballast water stored in the ballast tank is discharged;
   (d), after the measuring (b), measuring a concentration of the sterilizing component comprised in the ballast water in the returning (c); and
   (e) supplying the sterilizing component to the ballast pipe in the returning (c), such that a concentration of the sterilizing component, comprised in the ballast water flowing through the ballast pipe, is in a range of from 0.2 to 0.5 times the concentration of the sterilizing component measured and input into the storage unit of the sterilization control unit in the measuring (b), if the concentration of the sterilizing component measured and input into the storage unit of the sterilization control unit in the measuring (d) is less than 0.2 times the concentration of the sterilizing component measured in the measuring (b),
   wherein, in the supplying (a), the sterilizing component is supplied to the ballast pipe such that the concentration of the sterilizing component measured in the measuring (b) is 6 mg/L or more.

2. The method of claim 1, comprising a plurality of the measuring (b), with a last measurement corresponding to a final performance of the measuring (b), before the returning (c) is performed.

3. The method of claim 2, wherein, when the concentration of the sterilizing component measured in the measuring (d) is less than 0.2 times the concentration of the sterilizing component measured in the last measurement, the sterilizing component in the supplying (e) is supplied to the ballast pipe such that the concentration of the sterilizing component comprised in the ballast water flowing through the ballast pipe is in a range of from 0.2 to 0.5 times the concentration of the sterilizing component measured in the last measurement.

4. The method of claim 2, wherein, when the concentration of the sterilizing component measured in the measuring (d) is less than 0.2 times the concentration of the sterilizing component measured in the plurality of the measuring (b) where a take-in amount of the ballast water is largest, in the supplying (e), the sterilizing component is supplied to the ballast pipe such that the concentration of the sterilizing component comprised in the ballast water flowing through the ballast pipe is in a range of from 0.2 to 0.5 times the concentration of the sterilizing component measured in the plurality of the measuring (b) where the take-in amount of the ballast water is largest.

5. The method of claim 2, wherein, when the concentration of the sterilizing component measured in the measuring (d) is less than 0.2 times a maximum value of the concentration of the sterilizing component measured in the plurality of the measuring (b), in the supplying (e), the sterilizing component is supplied to the ballast pipe such that the concentration of the sterilizing component in the ballast water flowing through the ballast pipe is in a range of from 0.2 to 0.5 times the maximum value.

6. The method of claim 2, wherein in the supplying (a), the sterilizing component is supplied to the ballast pipe such that the concentration of the sterilizing component measured in the measuring (b) becomes 10 mg/L or less, and
   wherein, when the concentration of the sterilizing component measured in the measuring (d) is less than 0.2 times a minimum value of the concentration of the sterilizing component measured in the plurality of the measuring (b), in the measuring (d), the sterilizing component is supplied to the ballast pipe such that the concentration of the sterilizing component in the ballast water flowing through the ballast pipe is in a range of from 0.2 to 0.5 times all sterilizing concentrations measured in the plurality of the measuring (b).

7. The method of claim 1, wherein a concentration of the sterilizing component in the ballast water after the sterilizing component is supplied in the supplying (e) is in a range of from 2.2 to 3.8 mg/L.

8. The method of claim 1, wherein a concentration of the sterilizing component in the ballast water after the sterilizing component is supplied in the supplying (e) is in a range of from 2.5 to 3.5 mg/L.

* * * * *